No. 654,743. Patented July 31, 1900.
F. F. LOEPER.
STONE CUTTING MACHINE.
(Application filed Sept. 3, 1898.)

(No Model.)

Witnesses:
Wilh. Loeper
E. Loeper

Inventor,
Felix F. Loeper

UNITED STATES PATENT OFFICE.

FELIX F. LOEPER, OF DRESDEN, GERMANY.

STONE-CUTTING MACHINE.

SPECIFICATION forming part of Letters Patent No. 654,743, dated July 31, 1900.

Application filed September 3, 1898. Serial No. 690,150. (No model.)

*To all whom it may concern:*

Be it known that I, FELIX F. LOEPER, patent solicitor and civil engineer, a subject of the King of Prussia, German Emperor, residing at Dresden, in the Kingdom of Saxony, German Empire, have invented certain new and useful Improvements in Stone-Cutting Machines; and I do declare hereby that the following is a full, clear, and exact description of the invention, which will enable others skilled in the art to which it appertains to use the same.

My invention relates to a saw-machine consisting of a frame in which a cable-saw moves downward by means of sliding blocks, the movement of which is controlled by patterns or templets. The saw works horizontally across the frame. The to-and-fro movement is given to the saw by means of any kind of motive power. The stone resting on a table-plate is moved against the saw horizontally. By the combination of these different movements the cable-saw follows the irregular lines of a pattern or templet and cuts the stone, producing the same contour as the design of the templet.

Figure 1:
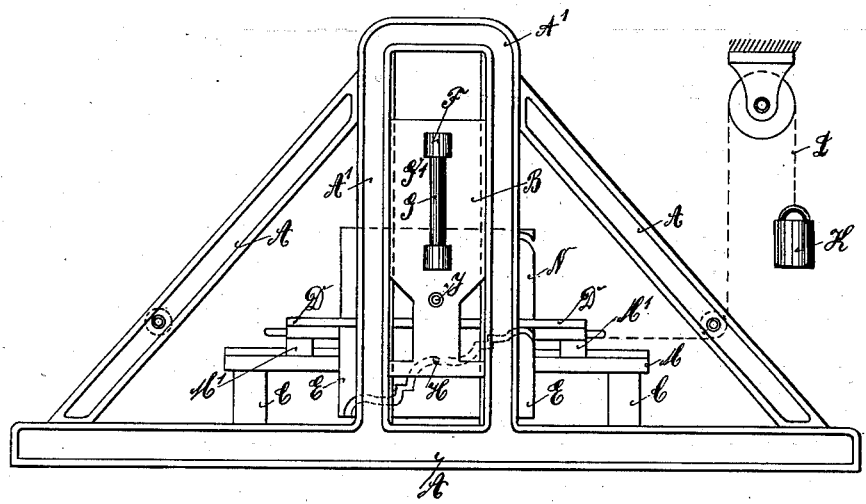
Figure 2:
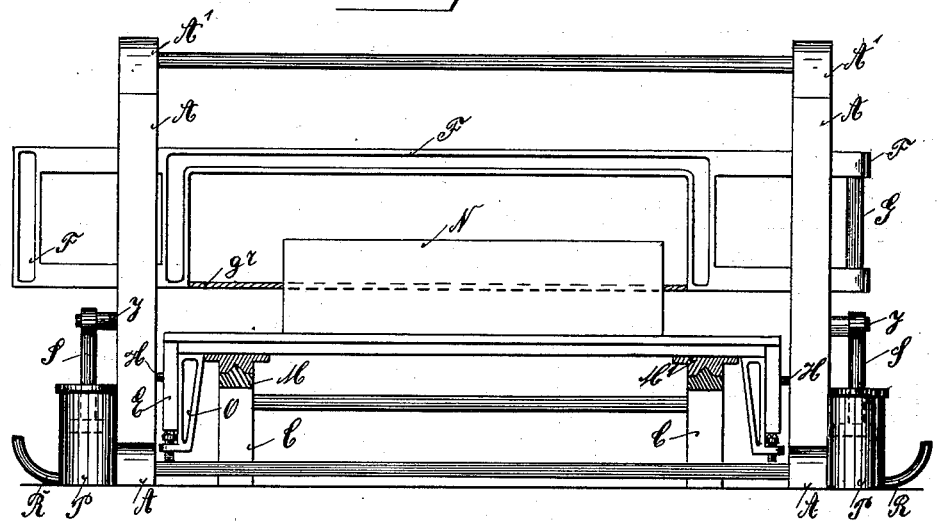

In the accompanying drawings, Figure 1 shows a side view, and Fig. 2 a front view, of the machine.

A is the frame of the machine, and A' the center piece of the same. Between the sides of this center piece there is arranged a sliding block B, capable of moving downward in accordance with the contour of one or more templets. The center of the block B is provided with an opening G, supporting the saw-frame F, to which is fastened the saw-cable $g\ r$.

On the bottom of the frame of the machine is fastened a table C, with a plate D, adapted to run upon angular guides M M', fixed to the table C. The table-plate D, moving against the saw, supports the stone N.

On the sides and below the table-plate D are fixed brackets O, which hold the templets E. In these templets E run the pins F, attached to the sliding blocks B. The motive power of the table-plate D is a pulley device L K, with a heavy weight.

To regulate the downward sliding of the block B, so that the movement of the saw is uniform and the saw-cable is prevented from being strained, hydraulic cylinders P P, with piston S, are so connected to the sliding block B as to act as brakes. A pipe (not shown in the drawings) connects the two cylinders P P to keep the liquid at an even level in both. The waste-pipes R, fitted to the bottom of the cylinders P P, allow the escape of so much water as becomes superfluous through the pressure of the block B. It is also possible by means of a simple cock to control the outflow of the water and by this means the rapidity of the sinking of the saw.

The working of the machine is as follows: Stone N is placed on the table-plate D and there secured. The saw-arm F is put in motion by means of any kind of motor. The saw works across the stone N and, sinking with its supporting-block B, follows the lines of the templet E, which again moves with the table-plate D.

Instead of ordinary templets circular templets may be used. Instead of one saw-cable more may be used, and in lieu of one block more blocks may be employed.

What I claim as my invention, and desire to secure by Letters Patent, is—

1. In a sawing-machine, the combination of a saw, with a table-plate supporting the stone to be sawed, a templet fixed to the said table-plate, a sliding block bearing the saw and adapted to move downward in accordance with the contour of the templet, a brake connected with the said sliding block and adapted to control the downward movement of the same, and means for moving the said table-plate against the saw, substantially as and for the purpose set forth.

2. In a sawing-machine the combination of a saw, with a table-plate supporting the stone to be sawed, a templet fixed to the said table-plate, a weight adapted to move the said table-plate against the saw, a sliding block bearing the saw and adapted to move downward, a pin fixed to the said sliding block and capable of bearing against the contour of the said templet, and a brake connected with the said sliding block and adapted to control the downward movement of the same, substantially as and for the purpose set forth.

3. In a sawing-machine, the combination of a saw, with a table-plate for supporting the material to be sawed, a bracket on the table-plate, a templet secured in the bracket, a sliding block bearing the saw and adapted to move downward, a pin fixed to the sliding block and capable of following the contour of the templet, and a brake adapted to control the downward movement of the sliding block and consisting of a hydraulic cylinder and piston, substantially as described.

In witness whereof I have hereunto signed my name in the presence of two subscribing witnesses.

FELIX F. LOEPER.

Witnesses:
WILH. LOEPER,
E. LOEPER.